US011873823B1

(12) United States Patent
Wang

(10) Patent No.: US 11,873,823 B1
(45) Date of Patent: Jan. 16, 2024

(54) FAN COMPONENT OF FAN LAMP AND FAN LAMP ASSEMBLY

(71) Applicant: Xiaoyan Wang, Hunan (CN)

(72) Inventor: Xiaoyan Wang, Hunan (CN)

( * ) Notice: Subject to any disclaimer, the term of this patent is extended or adjusted under 35 U.S.C. 154(b) by 0 days.

(21) Appl. No.: 18/332,250

(22) Filed: Jun. 9, 2023

(51) Int. Cl.

| | |
|---|---|
| ***F04D 25/02*** | (2006.01) |
| ***F21V 33/00*** | (2006.01) |
| ***F04D 29/34*** | (2006.01) |
| ***F04D 19/00*** | (2006.01) |
| ***F04D 25/08*** | (2006.01) |

(52) U.S. Cl.
CPC ......... *F04D 25/028* (2013.01); *F04D 19/002* (2013.01); *F04D 25/088* (2013.01); *F04D 29/34* (2013.01); *F21V 33/0096* (2013.01)

(58) Field of Classification Search
None
See application file for complete search history.

(56) References Cited

U.S. PATENT DOCUMENTS 4,776,761 A 10/1988 Diaz
6,213,716 B1 4/2001 Bucher
6,666,652 B2 12/2003 Bucher
7,153,100 B2 * 12/2006 Frampton ............. F04D 25/088 416/143
8,790,085 B2 * 7/2014 Villella ............... F21V 33/0096 416/223 R
9,903,439 B2 * 2/2018 Takahashi ......... F16F 15/13157
10,935,043 B1 3/2021 Liu
2006/0140769 A1 * 6/2006 Frampton ............. F04D 25/088 416/210 R
2012/0045331 A1 * 2/2012 Villella ................... F04D 29/36 416/5
2016/0290434 A1 * 10/2016 Takahashi ......... F16F 15/13157

OTHER PUBLICATIONS

YouTube—Solidworks Fun Channel (https://www.youtube.com/watch?v=8xhWVws_0AU—Published Jun. 9, 2021) (Year: 2021).*

* cited by examiner

*Primary Examiner* — Juan G Flores

(57) ABSTRACT

A fan component and a fan lamp assembly, wherein the fan component includes a blade mounting disc and a plurality of fan blades, one side of the blade mounting disc away from the fan blades is provided with planetary gears synchronously rotating with corresponding fan blades and a solar gear capable of rotating relative to the blade mounting disc, a peripheral surface of the solar gear is provided with first spring mounting structures, the blade mounting disc is provided with a second spring mounting structures, a return tension spring is connected between each pair of the first spring mounting structures and the second spring mounting structures, and each return tension spring is arranged on a circumferential outside of the solar gear.

8 Claims, 4 Drawing Sheets

FAN COMPONENT OF FAN LAMP AND FAN LAMP ASSEMBLY

TECHNICAL FIELD

The present invention relates to the field of luminaires, and in particular to a fan component of a fan lamp and a fan lamp assembly.

BACKGROUND

A fan lamp is an electrical appliance which combines functions of a ceiling lamp and a ceiling fan. In use, the lamp and the fan are separately controlled, and the electrical appliances having two different functions are combined together. The fan lamp has beautiful appearance, is equipped with different colors and different styles of fan blades and lighting, and has functions such as lighting, cooling and decoration.

At present, many fan lamps use transparent materials to make fan blades. It can improve appearance beauty of the fan lamps, however, if you observe it closely, you can still see the fan blades clearly, and the improvement of appearance beauty is very limited. Moreover, the fan blade opening outward is very easy to accumulate ash, so that the transparent fan blade is very ugly, which affects the overall beauty of the fan lamp.

Therefore, a fan lamp that is capable of folding the fan blades emerges in the market. When the fan blades are folded, the appearance beauty of the fan lamp can be improved, and the ash accumulation problem can be greatly reduced. However, due to structural design problems, a return tension spring of an existing fan component is set on one side of a solar gear, which increases vertical thickness of the fan component and affects the appearance beauty of the fan lamp.

It is urgent to solve these problems.

SUMMARY

The purpose of the present invention is to provide a fan component of a fan lamp and a fan lamp assembly. A return tension spring and a solar gear are in the same plane, so as to reduce vertical thickness of the fan component and improve appearance beauty of the fan lamp.

To achieve the above objective, the present invention provides the following technical solution:

A fan component of a fan lamp, wherein the fan component comprises a blade mounting disc and a plurality of fan blades that are rotationally mounted along a circumferential direction and on the same side of the blade mounting disc, one side of the blade mounting disc away from the fan blades is provided with planetary gears synchronously rotating with corresponding fan blades and a solar gear capable of rotating relative to the blade mounting disc, the planetary gears are distributed along the circumferential direction around the solar gear, and are meshed with the solar gear, wherein a peripheral surface of the solar gear is provided with at least one first spring mounting structure, one side of the blade mounting disc away from the fan blades is provided with second spring mounting structures respectively located on the same side of the first spring mounting structures, a return tension spring is connected between each pair of the first spring mounting structures and the second spring mounting structures, and each return tension spring is arranged on a circumferential outside of the solar gear; and when the blade mounting disc rotates at a high speed, the solar gear rotates relative to the blade mounting disc in a direction of pulling the return tension springs, so that the fan blades expand outward; when the blade mounting disc stops rotating, the solar gear rotates reversely under driving of each return tension spring, so that each fan blade packs up inwards.

Further, each of the first spring mounting structures is a first boss formed on an outer peripheral face of the solar gear protruding radially outward, and the first boss is provided with a first hanging opening matching a hook of the return tension spring, each of the second spring mounting structure is a second boss protruding on one side of the blade mounting disc in a direction away from a fan blade, the second boss is provided with a second hanging opening matching the hook of the return tension spring, and the hooks at both ends of the return tension spring are respectively hung on the corresponding first hanging opening and second hanging opening.

Further, there are a plurality of the first spring mounting structures, a plurality of the second spring mounting structures and a plurality of the return tension springs, the first spring mounting structures are evenly distributed in the solar gear along the circumferential direction, the second spring mounting structures are evenly distributed in the first spring mounting structures along the circumferential direction, and the return tension springs are evenly distributed around the solar gear along the circumferential direction.

Further, part of a peripheral surface of each of the planetary gears is provided with a segment of driven teeth, part of the peripheral surface of the solar gear is provided with driving teeth respectively matched with each segment of the driven teeth, and the solar gear defines a maximum angle of two-way rotation thereof through a rotation limit structure.

Further, the solar gear comprises a solar wheel base ring with a ring structure; each segment of the driving teeth is distributed on a peripheral surface of the solar wheel base ring along the circumferential direction; one side of the blade mounting disc far away from the fan blades protrudes to form a cylindrical boss matched with the solar wheel base ring; the solar wheel base ring is rotationally sleeved on the cylindrical boss; the rotation limit structure comprises a rotation limit bulge protruding outwardly from the cylindrical boss along a radial direction, a rotation limit stop protruding inwardly from the solar wheel base ring along a radial direction and a locking step protruding outwardly from the solar wheel base ring along a radial direction; and the locking step is provided at the same end of at least one segment of driving teeth; and when the rotation limit bulge abuts against the rotation limit stop, a maximum angle of rotation of the solar gear in one direction is defined; and when the driven teeth are locked on the locking step, a maximum angle of rotation of the solar gear in the other direction is defined.

Further, the locking step is provided at the same end of each segment of the driving teeth, the rotation limit bulges having the same number as the planetary gears protrude and form on a peripheral surface of the cylindrical boss, and an inner circumferential surface of the solar wheel base ring protrudes and forms the rotation limit stops having the same number as the planetary gears.

Further, an inner circumferential surface of the solar wheel base ring protrudes and forms rotation support sliders matched with corresponding rotation limit bulges, the rotation limit bulges are capable of being supported on the corresponding rotation support sliders in a sliding form, and one ends of the rotation support sliders protrude to form the rotation limit stops.

Further, one ends of the rotation support sliders away from the rotation limit stops have installation slots matching the rotation limit bulges.

Further, the fan blade and the planetary gear are connected through a pivot connecting assembly, the pivot connecting assembly comprises a bolt and a nut, the bolt is rotated to pass through the fan blade, the blade mounting disc and the planetary gear in turn and then is locked with the nut, so that the fan blade and the planetary gear are capable of rotating synchronously relative to the blade mounting disc.

In another aspect, provided is a fan lamp assembly, wherein the fan lamp assembly comprises a lamp holder, a driving motor installed at the bottom of the lamp holder and the fan component of fan lamp as above, the blade mounting disc is installed at the bottom of the driving motor, and is capable of being driven by the driving motor to rotate, the bottom of the blade mounting disc is enclosed with a lampshade, and the lampshade is enclosed with the blade mounting disc to form a light installation space in which a light source is installed.

It is known from analysis that with the fan component of fan lamp and the fan lamp assembly disclosed in the present invention, the positions of the first spring mounting structures and the second spring mounting structures are optimized, so that the return tension springs are all in the same plane with the solar gear, thus reducing the vertical thickness of the fan component, which makes it be more in line with the current thin aesthetic standard and improves the appearance beauty of the fan lamp.

BRIEF DESCRIPTION OF THE DRAWINGS

The drawings of the specification that constitutes a part of the present application are used to provide a further understanding of the present invention. The exemplary embodiments of the present invention and the description thereof are used to explain the present invention, and do not constitute an improper limitation of the present invention. In the drawings.

Figure 1:
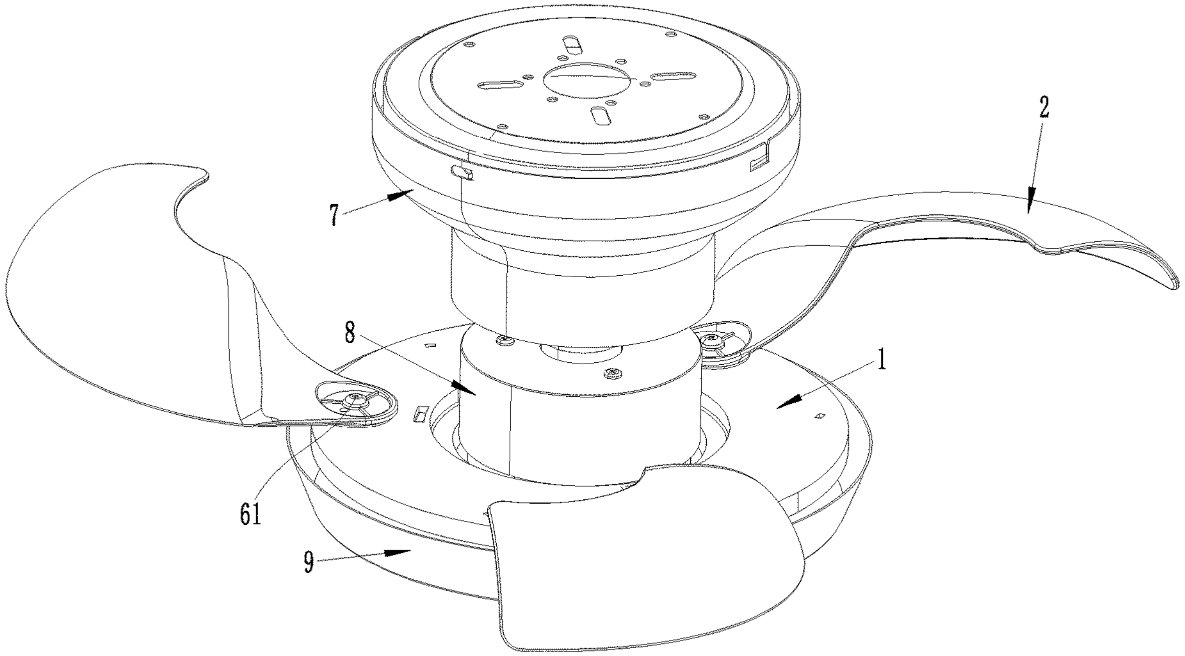
FIG. 1 is a structure diagram of a fan lamp assembly when fan blades are in an unfolded state.

Description of reference numbers: 1. blade mounting disc, 11. second spring mounting structure, 111. second hanging opening, 12. cylindrical boss, 13. rotation limit bulge, 2. fan blade, 3. planetary gear, 31. driven tooth, 4. solar gear, 41. first spring mounting structure, 411. first hanging opening, 42. solar wheel base ring, 421. rotation limit stop, 422. rotation support slider, 423. installation slot, 43. driving tooth, 431. locking step, 5. return tension spring, 6. pivot connecting component, 61. bolt, 62. nut, 7. lamp holder, 8. driving motor, 9. lampshade.

DETAILED DESCRIPTION OF THE EMBODIMENTS

The present invention is described in detail below with reference to the accompanying drawings and embodiments. Each example is provided to explain the present invention instead of limiting the present invention. In fact, those skilled in the art will appreciate that modifications and variations may be made in the present invention without departing from the scope or spirit of the present invention. For example, features shown or described as one part of one embodiment may be applied to another embodiment to generate yet another embodiment. Therefore, it is expected that the present invention includes such modifications and variations that fall within the scope of the appended claims and their equivalents.

In the description of the present invention, orientation or position relationships indicated by terms "longitudinal", "transverse", "upper", "lower", "front", "rear", "left", "right", "vertical", "horizontal", "top", "bottom" and the like are orientation or position relationships shown in the drawings, and these terms are merely for facilitating description of the present invention, but not for requiring that the present invention must be constructed and operated in a specific orientation, and thus, these terms cannot be understood as a limitation to the present invention. As used in the present invention, the terms "connected", "connection" and "set" should be understood in a broad sense, for example, they may be fixed connection or detachable connection, they may be direct connection or indirect connection through an intermediate part; or they may be wired connection and wireless connection, or may be connection through a wireless communication signal. For those of ordinary skill in the field, the specific meanings of the terms may be understood according to the specific conditions.

The accompanying drawings show one or a plurality of examples of the present invention. The detailed description uses reference numerals and letters to refer to the features in the accompanying drawings. Similar numeral references in the drawings and description have been used to refer to the similar parts in the present invention. As used herein, the terms "first", "second" and "third" are used interchangeably to distinguish one component from another component, and are not intended to indicate the position or importance of individual components.

As shown in FIG. 1 to FIG. 4, a fan component of a fan lamp is provided according to an embodiment of the present invention, wherein the fan component comprises a blade mounting disc 1 and a plurality of fan blades 2 that are rotationally mounted along a circumferential direction and on the same side of the blade mounting disc 1. In this embodiment, each fan blade 2 is evenly distributed along the circumferential direction to improve air supply and structural stability while reducing wind dryness.

One side of the blade mounting disc 1 away from the fan blades 2 is provided with planetary gears 3 synchronously rotating with corresponding fan blades 2 and a solar gear 4 capable of rotating relative to the blade mounting disc 1, that is, the solar gear 4 is rotationally installed on the blade mounting disc 1. The planetary gears 3 are distributed along the circumferential direction around the solar gear 4, and are meshed with the solar gear 4, that is, through the rotation of the solar gear 4, it can simultaneously drive the rotation of each planetary gear 3.

A peripheral surface of the solar gear 4 is provided with at least one first spring mounting structure 41, one side of the blade mounting disc 1 away from the fan blades 2 is provided with second spring mounting structures 11 respectively located on the same side of the first spring mounting structures 41, that is, the first spring mounting structures 41 and the second spring mounting structures 11 correspond one-to-one to form a number of pairs. A return tension spring 5 is connected between each pair of the first spring mounting structures 41 and the second spring mounting structures 11, and each return tension spring 5 is arranged on a circumferential outside of the solar gear 4. When the blade mounting disc 1 rotates at a high speed, the solar gear 4 rotates relative to the blade mounting disc 1 towards a direction of pulling the return tension springs 5, so that the fan blades 2 expand outward to realize an air supply function of the fan. At this time, each return tension spring 5 is stretched. When the blade mounting disc 1 stops rotating, the solar gear 4 rotates reversely under driving of each return tension spring 5, so that each fan blade 2 packs up inwards. At this time, each return tension spring 5 is reset.

Figure 3:
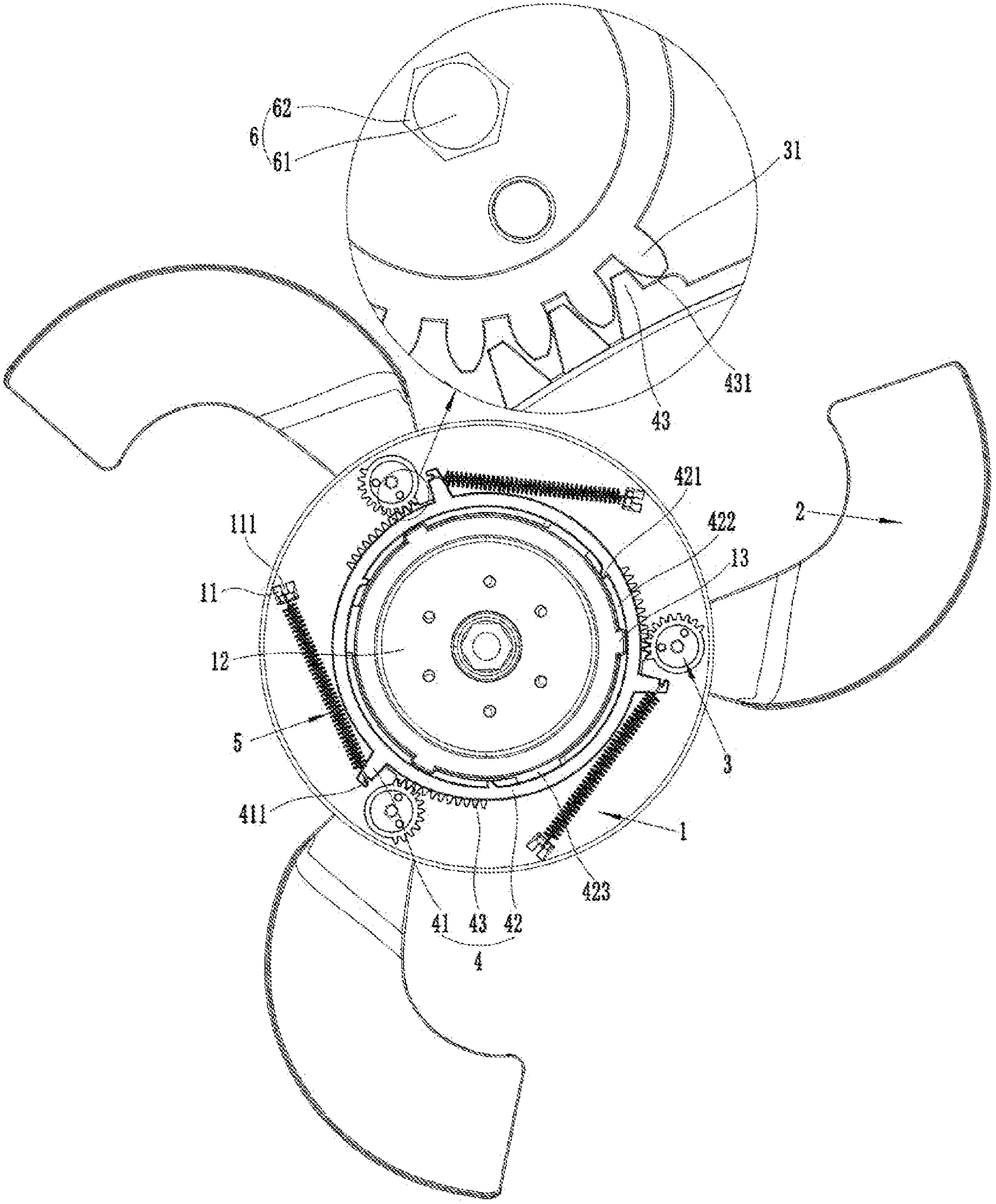
FIG. 3 is a structure diagram of a fan component when the fan blades are in the unfolded state.
Figure 4:
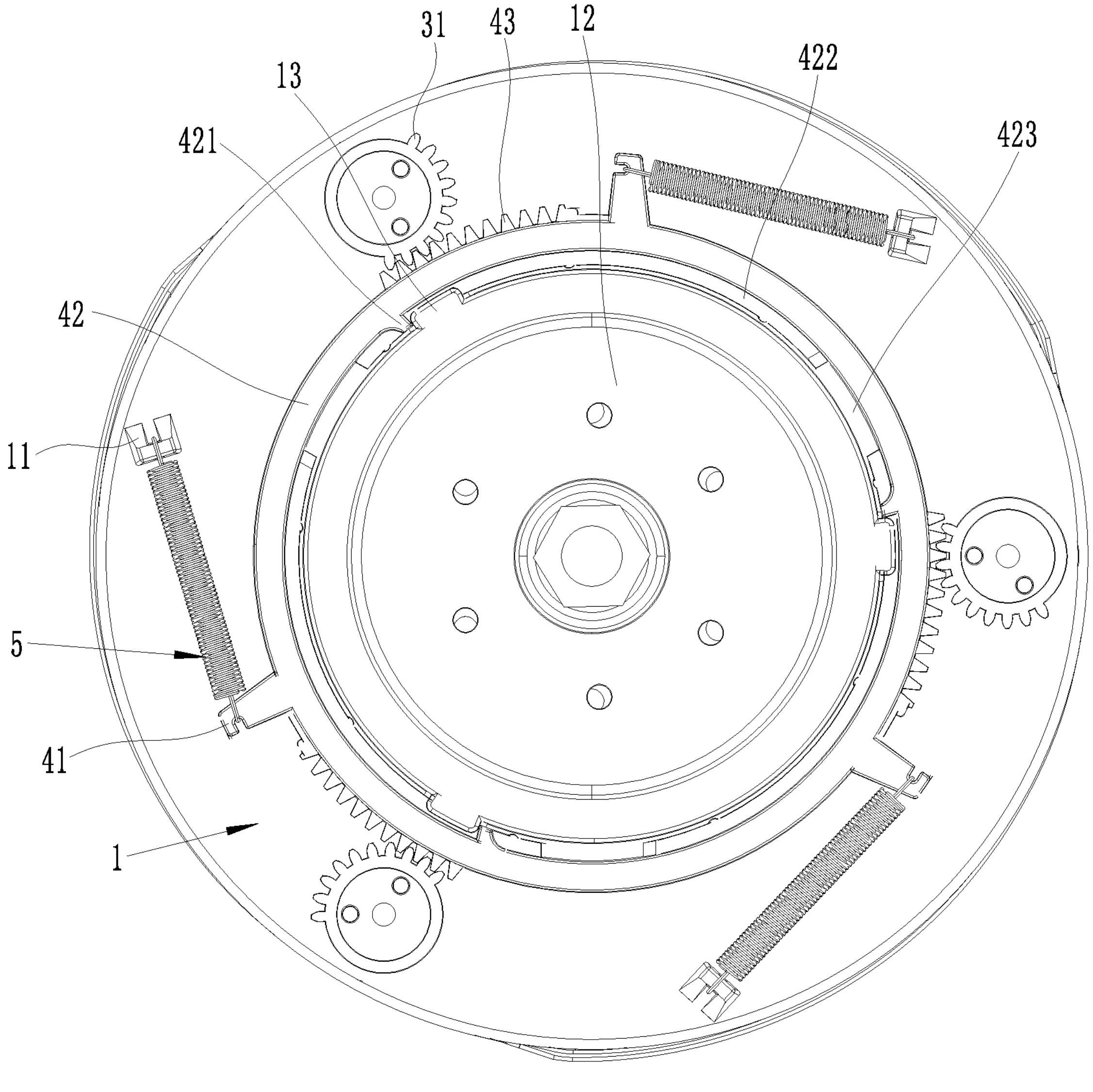
FIG. 4 is a structure diagram of a fan component when the fan blades are in the folded state.

Preferably, refer to FIG. 3 and FIG. 4, each of the first spring mounting structures 41 is a first boss formed on an outer peripheral face of the solar gear 4 protruding radially outward, and the first boss is provided with a first hanging opening 411 matching a hook of the return tension spring 5, each of the second spring mounting structure 11 is a second boss protruding on one side of the blade mounting disc 1 in a direction away from a fan blade 2, the second boss is provided with a second hanging opening 111 matching the hook of the return tension spring and the hooks at both ends of the return tension spring 5 are respectively hung on the corresponding first hanging opening 411 and second hanging opening 111. The structure is simple, while ensuring the reliable installation of the return tension springs 5.

Further, there are a plurality of the first spring mounting structures 41, a plurality of the second spring mounting structures 11 and a plurality of the return tension springs 5; adjacent first spring mounting structure 41, second spring mounting structure 11 and return tension spring 5 are taken as a group; each group of first spring mounting structure 41, and second spring mounting structure 11 and return tension spring 5 are evenly distributed on the solar gear 4 along the circumferential direction. That is, the first spring mounting structures 41 are evenly distributed in the solar gear 4 along the circumferential direction, the second spring mounting structures 11 are evenly distributed in the first spring mounting structures 41 along the circumferential direction, and the return tension springs 5 are evenly distributed around the solar gear 4 along the circumferential direction. By setting a plurality of return tension spring the overall structure is balanced, not easy to occur stuck, meanwhile ensuring a driving force of reset.

The first spring mounting structures 41 are integrated on the solar gear 4 and have a high structural strength and are durable, so that the first spring mounting structures 41 avoid fracture problems. Similarly, the second spring mounting structures 11 are also integrated on the blade mounting disc 1.

Preferably, refer to FIG. 3 and FIG. 4, part of a peripheral surface of each of the planetary gears 3 is provided with a segment of driven teeth 31, part of the peripheral surface of the solar gear 4 is provided with driving teeth 43 respectively matched with each segment of the driven teeth 31, and the solar gear 4 determines a maximum angle of two-way rotation thereof through a rotation limit structure. Thus, it can effectively limit a tensile length of the return tension spring 5 and increase the service life of the return tension spring 5. That is, the planetary gears 3 and the solar gear 4 are only provided with partial teeth on the peripheral surfaces, the planetary gears 3 and the solar gear 4 adopt a partial teeth design. Compared with ordinary whole teeth, it not only lowers processing cost, but also is more convenient for installation.

Further, the solar gear 4 comprises a solar wheel base ring 42 with a ring structure; each segment of the driving teeth 43 is distributed on a peripheral surface of the solar wheel base ring 42 along the circumferential direction. In this embodiment, each segment of the driving teeth 43 is uniformly distributed along the circumferential direction of the solar wheel base ring 42. One side of the blade mounting disc 1 far away from the fan blades 2 protrudes to form a cylindrical boss 12 matched with the solar wheel base ring 42, and the solar wheel base ring 42 is rotationally sleeved on the cylindrical boss 12, which is simple and reliable.

The rotation limit structure comprises a rotation limit bulge 13 protruding outwardly from the cylindrical boss 12 along a radial direction, a rotation limit stop 421 protruding inwardly from the solar wheel base ring 42 along a radial direction and a locking step 431 protruding outwardly from the solar wheel base ring 42 along a radial direction; and the locking step 431 is provided at the same end of at least one segment of driving teeth 43. Therefore, when the rotation limit bulge 13 abuts against the rotation limit stop 421, a maximum angle of rotation of the solar gear 4 in one direction is defined; and when the driven teeth 31 are locked on the locking step 431, a maximum angle of rotation of the solar gear 4 in the other direction is defined. Through such design, opening angle of fan blades 2 can be effectively limited, so that wind is stronger, the efficiency is higher, and the fan operation is safer.

Preferably, the locking step 431 is provided at the same end of each segment of the driving teeth 43, the rotation limit bulges 13 having the same number as the planetary gears 3 protrude to form on a peripheral surface of the cylindrical boss 12, and an inner circumferential surface of the solar wheel base ring 42 protrudes and forms the rotation limit stops 421 having the same number as the planetary gears 3. By setting the locking step 431 and utilizing the cooperation of the rotation limit bulges 13 and the rotation limit stops 421, a maximum angle of two-way rotation of the solar gear 4 can be defined very reliably, so that each fan blade 2 can be accurately positioned.

Further, an inner circumferential surface of the solar wheel base ring 42 protrudes and forms rotation support sliders 422 matched with corresponding rotation limit bulges 13, the rotation limit bulges 13 are capable of being supported on the corresponding rotation support sliders 422 in a sliding form, and one ends of the rotation support sliders 422 protrude to form the rotation limit stops 421. By setting the rotation support sliders 422, the sliding of the rotation limit bulges 13 is ensured to be smoother and the matching accuracy is improved.

Meanwhile, one ends of the rotation support sliders 422 away from the rotation limit stops 421 have installation slots 423 matching the rotation limit bulges 13. That is, the rotation limit bulges 13 can pass through the installation slots 423, ensuring the convenience of installation and reducing the difficulty of assembly.

Preferably, refer to FIG. 1 and FIG. 3, the fan blade 2 and the planetary gear 3 are connected through a pivot connecting assembly 6, the pivot connecting assembly 6 comprises a bolt 61 and a nut 62, the bolt 61 is rotated to pass through the fan blade 2, the blade mounting disc 1 and the planetary gear 3 in turn and then is locked with the nut 62, so that the fan blade 2 and the planetary gear 3 are capable of rotating synchronously relative to the blade mounting disc 1. Therefore, when the fan blade 2 is damaged or needs to be cleaned, it can be removed directly by removing the bolt 61 and the nut 62, which greatly improves the convenience of disassembly and assembly, and facilitates the removal, replacement and cleaning of parts.

Figure 2:
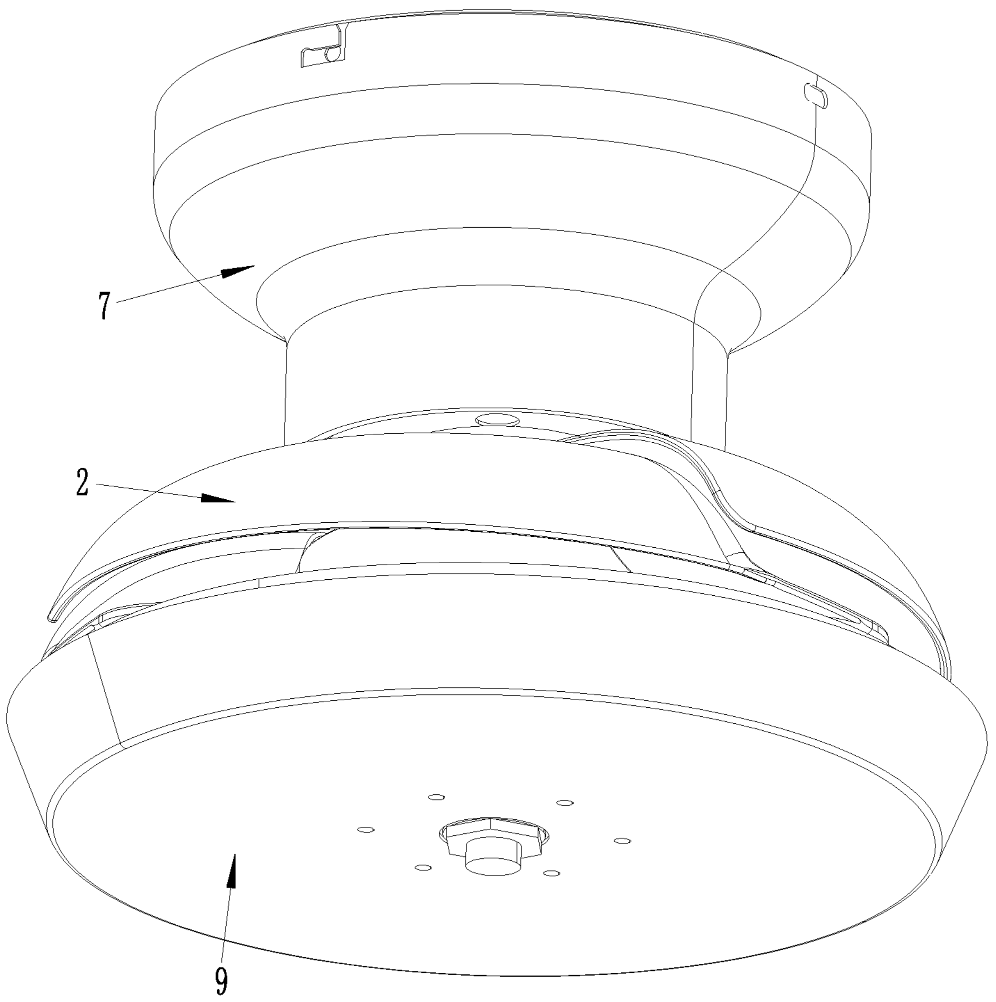
FIG. 2 is a structure diagram of the fan lamp assembly when the fan blades are in a folded state.

Further, refer to FIG. 1 to FIG. 3, an outer edge of the fan blade 2 is designed with a radian, which not only ensures the air volume, but also makes the fan blade 2 more beautiful in a packed up state and integrates with the whole fan lamp.

Refer to FIG. 1 and FIG. 2, also disclosed in the present invention is a fan lamp assembly, wherein the fan lamp assembly comprises a lamp holder 7, a driving motor 8 installed at the bottom of the lamp holder 7 and a fan component of fan lamp as above, the blade mounting disc 1 is installed at the bottom of the driving motor 8, and is capable of being driven by the driving motor 8 to rotate, the bottom of the blade mounting disc 1 is enclosed with a lampshade 9, and the lampshade 9 is enclosed with the blade mounting disc 1 to form a light installation space in which a light source is installed. Specifically, the driving motor 8 in this embodiment is similar to a hub motor wherein a motor shaft does not rotate, but a motor housing does. Therefore, the blade mounting disc 1 rotates synchronously to be sleeved on the motor housing, while the lampshade 9 is fixed on the motor shaft and does not rotate. Thus, a light source is installed on the lampshade 9, that is, the light source is located inside the lampshade 9 to ensure the quality of lighting.

From the above description, it can be seen that the above embodiments of the present invention achieve the following technical effects:

1. In this embodiment, the positions of the first spring mounting structures 41 and the second spring mounting structures 11 are optimized, so that the return tension springs 5 are all in the same plane with the solar gear 4. Compared with the prior art, the vertical thickness of the fan component is reduced, which makes it be more in line with the current thin aesthetic standard and improves the appearance beauty of the fan lamp.
2. By designing the teeth on the peripheral surfaces of planetary gears 3 and solar gear 4 as partial teeth, compared with ordinary whole teeth, the planetary gears 3 and solar gear 4 in this embodiment not only have lower processing cost, but also more convenient for installation.

The above is merely illustrative of the preferred embodiments of the present invention and is not intended to limit the present invention, and various changes and modifications may be made by those skilled in the art. Any modifications, equivalent substitutions, improvements, etc. made within the spirit and scope of the present invention should be included within the protection scope of the present invention.

What is claimed is:

1. A fan component of a fan lamp, wherein the fan component comprises a blade mounting disc and a plurality of fan blades that are rotationally mounted along a circumferential direction and on a same side of the blade mounting disc, one side of the blade mounting disc away from the fan blades is provided with planetary gears synchronously rotating with corresponding fan blades and a solar gear capable of rotating relative to the blade mounting disc, the planetary gears are distributed along a circumferential direction around the solar gear, and are meshed with the solar gear, wherein a peripheral surface of the solar gear is provided with first spring mounting structures, one side of the blade mounting disc away from the fan blades is provided with second spring mounting structures respectively located on the same side of the first spring mounting structures, a return tension spring is connected between each pair of the first spring mounting structures and the second spring mounting structures, and each return tension spring is arranged on a circumferential outside of the solar gear; and when the blade mounting disc rotates at a high speed, the solar gear rotates relative to the blade mounting disc in a direction of pulling the return tension springs, so that the fan blades expand outward; when the blade mounting disc stops rotating, the solar gear rotates reversely under driving of each return tension spring, so that each fan blade packs up inwards;

wherein part of a peripheral surface of each of the planetary gears is provided with a segment of driven teeth, part of the peripheral surface of the solar gear is provided with driving teeth respectively matched with the segment of the driven teeth, and a maximum angle of rotation of the solar gear is defined through a rotation limit structure;

wherein the solar gear comprises a solar wheel base ring with a ring structure; each segment of the driving teeth is distributed on a peripheral surface of the solar wheel base ring along the circumferential direction; one side of the blade mounting disc away from the fan blades protrudes to form a cylindrical boss matched with the solar wheel base ring; the solar wheel base ring is rotationally sleeved on the cylindrical boss; the rotation limit structure comprises a rotation limit bulge protruding outwardly from the cylindrical boss along a radial direction, a rotation limit stop protruding inwardly from the solar wheel base ring along a radial direction and a locking step protruding outwardly from the solar wheel base ring along a radial direction; and the locking step is provided at a same end of at least one segment of driving teeth; and when the rotation limit bulge abuts against the rotation limit stop, the maximum angle of rotation of the solar gear in one direction is defined; and when the driven teeth are locked on the locking step, the maximum angle of rotation of the solar gear in an other direction is defined.

2. The fan component of a fan lamp according to claim 1, wherein each of the first spring mounting structures is a first boss formed on an outer peripheral face of the solar gear protruding radially outward, and the first boss is provided with a first hanging opening matching a hook of the return tension spring, each of the second spring mounting structures is a second boss protruding on one side of the blade mounting disc in a direction away from a fan blade, the second boss is provided with a second hanging opening matching another hook of the return tension spring, and the hooks at both ends of the return tension spring are respectively hung on the corresponding first hanging opening and second hanging opening.

3. The fan component of a fan lamp according to claim 1, wherein the first spring mounting structures are evenly distributed in the solar gear along the circumferential direction, the second spring mounting structures are evenly distributed in the first spring mounting structures along the circumferential direction, and the return tension springs are evenly distributed around the solar gear along the circumferential direction.

4. The fan component of a fan lamp according to claim 1, wherein the locking step is provided at the same end of each segment of the driving teeth, the rotation limit bulges having the same number as the planetary gears protrude and form on a peripheral surface of the cylindrical boss, and an inner circumferential surface of the solar wheel base ring protrudes and forms the rotation limit stops having the same number as the planetary gears.

5. The fan component of a fan lamp according to claim 1, wherein an inner circumferential surface of the solar wheel base ring protrudes and forms rotation support sliders matched with corresponding rotation limit bulges, the rotation limit bulges are capable of being supported on the corresponding rotation support sliders in a sliding form, and ends of the rotation support sliders protrude to form the rotation limit stops.

6. The fan component of a fan lamp according to claim 5, wherein ends of the rotation support sliders away from the rotation limit stops have installation slots matching the rotation limit bulges.

7. The fan component of a fan lamp according to claim 1, wherein the plurality of fan blades and the planetary gears are connected through a pivot connecting assembly, the pivot connecting assembly comprises a bolt and a nut, the bolt is rotated to pass through the plurality of fan blades, the blade mounting disc and the planetary gears in turn and then is locked with the nut, so that the plurality of fan blades and the planetary gears are capable of rotating synchronously relative to the blade mounting disc.

8. A fan lamp assembly, wherein the fan lamp assembly comprises a lamp holder, a driving motor installed at a bottom of the lamp holder and the fan component of claim 1; wherein the blade mounting disc is installed at a bottom of the driving motor, and is capable of being driven by the driving motor to rotate, a bottom of the blade mounting disc is enclosed with a lampshade, and the lampshade is enclosed with the blade mounting disc to form a light installation space in which a light source is installed.

* * * * *